United States Patent [19]

Kline et al.

[11] Patent Number: 5,195,705
[45] Date of Patent: Mar. 23, 1993

[54] MICROSCOPE STAND AND ARMREST SYSTEM

[75] Inventors: Richard C. Kline, Loveland, Colo.; James R. McCaleb, El Paso, Tex.

[73] Assignee: Scopease, Inc., El Paso, Tex.

[21] Appl. No.: 878,758

[22] Filed: May 5, 1992

[51] Int. Cl.⁵ .............................................. B43L 15/00
[52] U.S. Cl. .................................. 248/118.3; 248/118; 248/346
[58] Field of Search .............. 248/346, 118, 118.1, 248/118.3, 118.5, 918, 921, 186, 188.1, 150, 188.2, 151; 400/715; 84/328

[56] References Cited

U.S. PATENT DOCUMENTS

| | | | |
|---|---|---|---|
| 105,001 | 7/1870 | Sanborn | 248/118.5 |
| 399,266 | 3/1889 | Hall | 248/118 X |
| 655,284 | 8/1900 | Thier | 248/118.3 |
| 1,013,868 | 1/1912 | Dour | 248/118.3 X |
| 1,632,160 | 6/1927 | Barnes | 248/118 |
| 1,822,500 | 9/1931 | Muther | 248/346 |
| 2,297,556 | 9/1942 | Hermann | 248/346 |
| 2,893,164 | 7/1959 | Martin | 248/188.2 |
| 3,411,766 | 11/1968 | Lanigan | 248/346 |
| 4,044,980 | 8/1977 | Cummino | 248/459 X |
| 4,568,056 | 2/1986 | Lewinski | 248/918 X |
| 4,607,886 | 8/1986 | Mazhar | 248/118 X |
| 4,619,427 | 10/1986 | Leymann | 248/918 X |
| 4,624,433 | 11/1986 | Henneberg | 248/346 |
| 4,709,972 | 12/1987 | LaBudde et al. | 400/715 X |
| 4,805,859 | 2/1989 | Hudson | 248/148 |
| 4,973,176 | 11/1990 | Dietrich | 248/118 X |
| 5,040,757 | 8/1991 | Benaway | 400/715 X |
| 5,050,826 | 9/1991 | Johnston | 400/715 X |
| 5,072,905 | 12/1991 | Hyatt | 248/118 |

Primary Examiner—Alvin C. Chin-Shue
Assistant Examiner—Korie H. Chan
Attorney, Agent, or Firm—William E. Hein

[57] ABSTRACT

A microscope stand and armrest system for placement on a conventional desktop includes height adjustment-/levelling feet at each corner of a base plate and a top surface hingedly attached to the base plate for receiving a microscope and for tilting the microscope rearward toward the user to a position that allows the user to look directly forward when operating the microscope. Left and right sloping armrests are provided for placement on the desktop at each side of the microscope stand to support the user's forearms in natural positions while operating the microscope.

10 Claims, 2 Drawing Sheets

MICROSCOPE STAND AND ARMREST SYSTEM

BACKGROUND AND SUMMARY OF THE INVENTION

This invention relates generally to microscopes and more specifically to a microscope stand and armrest system for use with microscopes to provide a more comfortable operating environment for users of microscopes. Microscopes are in widespread use today, particularly in the healthcare industry, where pathologists and cytotechnologists are required to sit at microscopes for hours at a time in order to do their jobs productively. These users of microscopes experience back, arm, and shoulder strain as the result of prolonged daily use involving the manipulation of stage controls and fine adjustment controls while their heads are tilted forward and downward. Manufacturers of microscopes have not addressed the ergonomic needs of users, but have rather chosen to produce these instruments in one basic configuration for placement in a fixed position on the surface of a desk.

Regular users of microscopes have improvised for years, attempting to customize specific workstations to provide a more comfortable environment for the prolonged use of these instruments. Perhaps the most common attempt to position a microscope for more comfortable use has been to stack books under it. This attempted solution is disadvantageous in that the stack of books may be unstable, subjecting the expensive and delicate microscope to damage if it should fall. A known microscopy workstation marketed by Leitz Instrument Corporation permits vertical adjustment of a desktop work surface in an attempt to accommodate large and small, short and tall users. However, these workstations are not cost effective in that they are as expensive as a microscope itself and, thus, beyond the affordability of most users. Moreover, they provide no adjustment for tilting the microscope so that the user may look directly forward into the binocular lens rather than downward.

It is therefore the principal object of the present invention to provide an ergonomic microscope stand and armrest system that effectively reduces the back and arm strain normally suffered by users of microscopes.

This and other objects are accomplished in accordance with the illustrated preferred embodiment of the present invention by providing a stand that may be placed on a conventional desktop and onto which a microscope may then be placed. The stand includes height adjustment/levelling feet at each corner and a hinged top surface that facilitates tilting the microscope rearward toward the user to a position that allows the user to hold his or her dead more erect and to look directly forward when using the microscope. Left and right sloping armrests are provided for placement on the desktop at each side of the stand to allow the user to rest his or her forearms in a natural position while manipulating the stage and fine adjustment controls of the microscope.

DESCRIPTION OF THE PREFERRED EMBODIMENT

Figure 1:
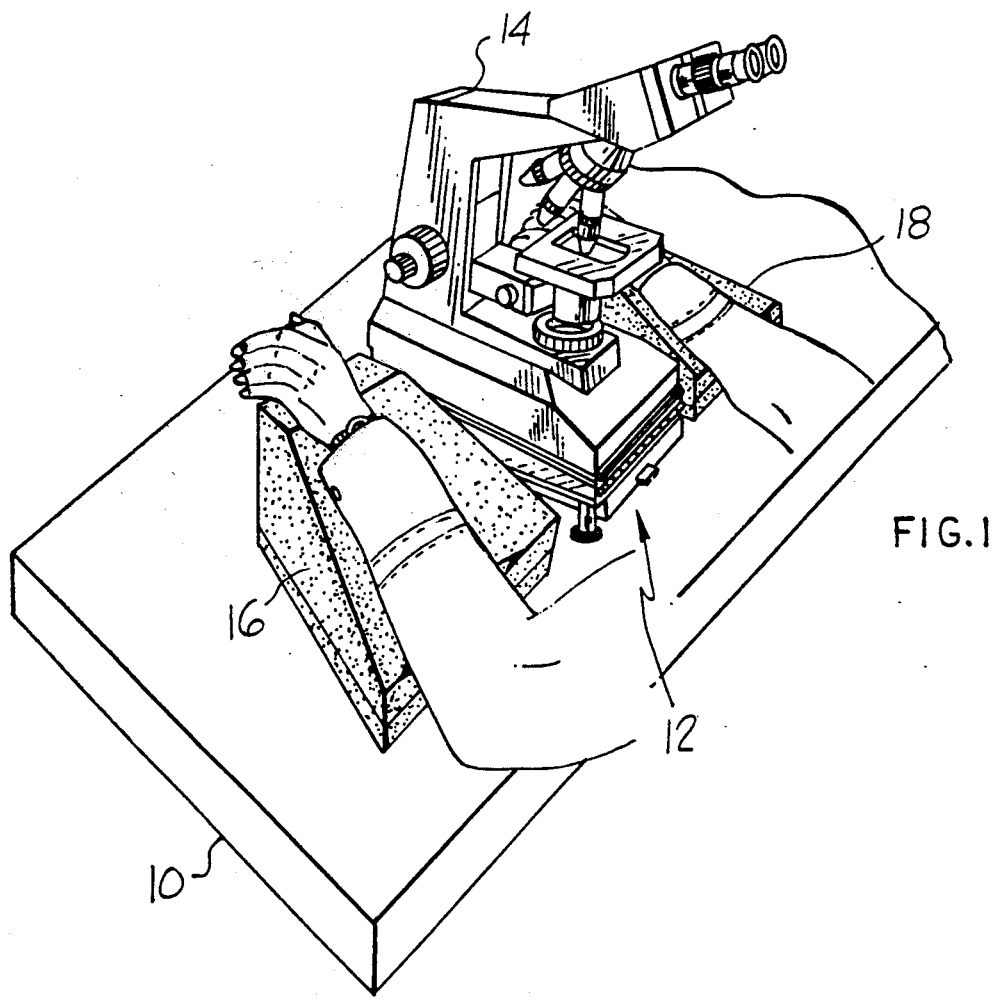
FIG. 1 is a pictorial diagram illustrating use of the microscope stand and armrest system of the present invention in conjunction with a conventional microscope.

Referring now to FIG. 1, there is shown a conventional desktop 10 on which a microscope stand 12 is positioned to support a conventional compound upright microscope 14. Left and right armrests 16, 18 are positioned on the desktop 10 at either side of microscope stand 12 to allow the user to rest his or her forearms in a comfortable position while manipulating the stage and fine adjustment controls of microscope 14.

Figure 2:
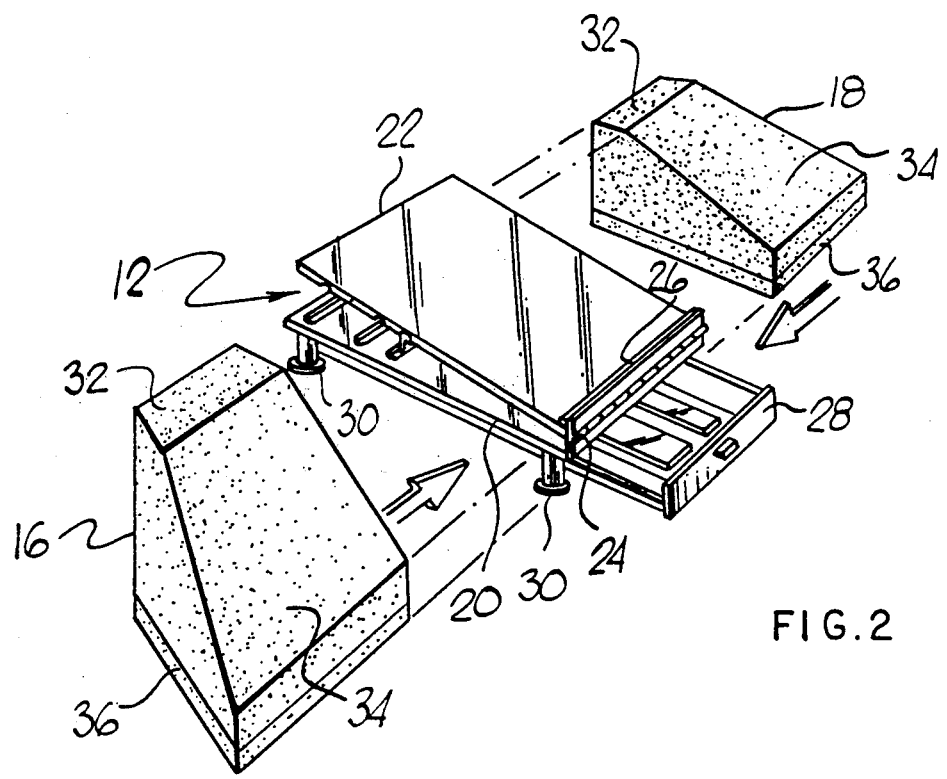
FIG. 2 is a pictorial diagram of the microscope stand and armrest system of FIG. 1 illustrating the way in which the top surface is hinged to permit tilting a microscope positioned thereon rearward toward the user.

Referring now to FIG. 2, microscope stand 12 includes a rectangular base plate 20 and a rectangular top plate 22 hingedly connected thereto by a hinge 24 attached to a rearward edge of base plate 20 and top plate 22. Top plate 22 includes a vertical lip 26 at its rearward edge to prevent microscope 14 from sliding off of top plate 22 when in the tilted position illustrated in FIG. 2. A slide-out drawer 28 is conventionally arranged beneath base plate 20 to retain small articles desired by the user. Conventional levelling feet 30 are attached at each of the four corners of base plate 20 on the underside thereof to provide the vertical space necessary to accommodate drawer 28 and to allow the user to adjust the overall height of stand 12. Base plate 20 and top plate 22 of microscope stand 12 may be conveniently fabricated of attractive smoke-colored acrylic sheet stock, for example. Any other suitable flat stock plastic or metallic material may, of course, be used.

Figure 3:
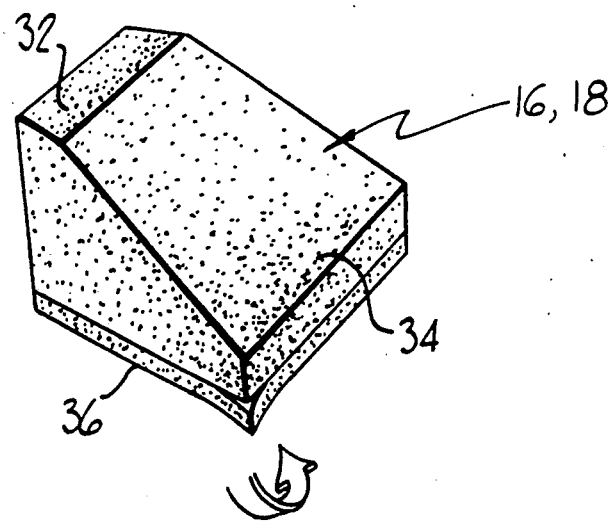
FIG. 3 is a pictorial diagram of one of the armrests of FIGS. 1 and 2 illustrating a tear away bottom layer that can be removed to lower the user's forearms.

As illustrated in FIGS. 1 and 2, left and right armrests 16, 18 may be positioned as desired by the user on each side of microscope stand 12 to support the user's forearms in natural positions while operating microscope 14. In order to provide the desired natural support, armrests 16, 18 include a horizontal top surface 32 proximate a forward edge thereof and a sloping top surface 34 rearward of the horizontal top surface 32. Armrests 16, 18 include a bottom section 36, adhesively connected to the remainder of armrests 16, 18. Bottom section 36 may be removed, as illustrated in FIG. 3, to lower armrests 16, 18 if desired by the user. Armrests 16, 18 may be constructed of any of a number of commercially available materials. However, grey polyurethane foam of 1.8 density has been found to provide comfortable support for the user's forearms.

Figure 4:
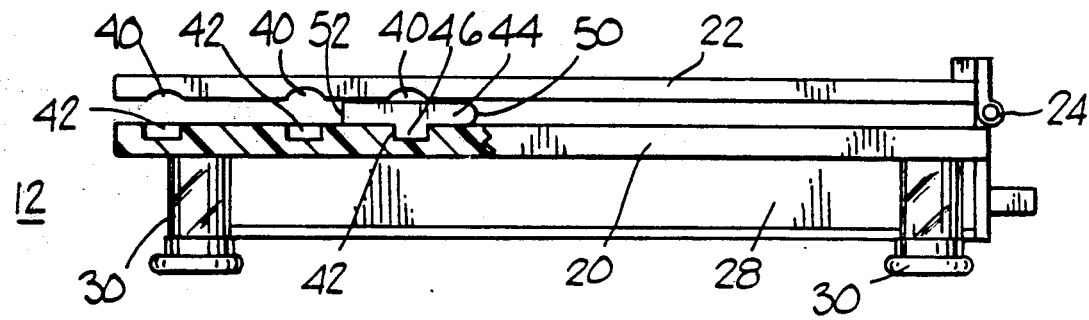
FIG. 4 is a left side view of the microscope stand of FIGS. 1 and 2 illustrating the top surface thereof in the horizontal position.
Figure 5:
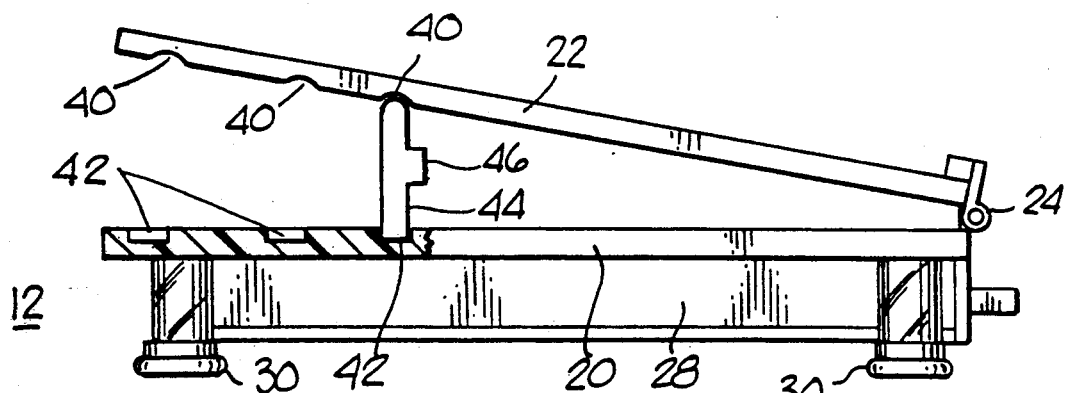
FIG. 5 is a left side view of the microscope stand of FIGS. 1 and 2 illustrating the top surface thereof in a raised position.

Referring now to FIGS. 4 and 5, a plurality of spaced-apart, downward-facing grooves 40 of semicircular cross-section are cut into the underside of top plate 22. Correspondingly positioned upward-facing grooves 42 of rectangular cross-section are cut into the top surface of base plate 20. When it is desired to position top plate 22 horizontally, a spacer bar 44 having a protrusion 46 of rectangular cross-section is positioned between top plate 22 and base plate 20 such that protrusion 46 matingly engages one of the grooves 42 in base plate 20. The thickness of spacer bar 44 is equal to the space between top plate 22 and base plate 20 when top plate 22 is in the horizontal position illustrated in FIG. 4. When it is desired to tilt top plate 22 to in turn tilt a microscope positioned thereon rearward toward the user, hinged top plate 22 is simply lifted, and spacer bar 44 is turned 90 degrees such that a rounded edge 50 thereof engages a desired one of grooves 40 and a rectangular edge 52 thereof engages a corresponding one of grooves 42 to thereby maintain top plate 22 at a desired angle of tilt with respect to horizontal base plate 20. Additional space bars like spacer bar 44, but of various widths, may be employed to provide a wide range of tilt angles of top plate 22. When not in use, the addtional spacer bars may be conveniently stored in drawer 28.

We claim:

1. A microscope stand and armrest system for placement on a fixed horizontal surface comprising:
    a base plate having a plurality of height adjustment-/levelling feet attached to an underside thereof;
    a top plate coextensively positioned over said base plate for receiving a microscope thereon, said base plate and said top plate being hingedly attached at rearward edges thereof such that said top plate may be angularly elevated with respect to the horizontal to thereby tilt the microscope received thereon rearward toward the user;
    tilt control means engaging said base plate and said top plate for maintaining said top plate in a desired position of angular elevation, said tilt control means comprising a plurality of spaced apart grooves provided on a top surface of said base plate, a plurality of spaced apart grooves correspondingly provided on a bottom surface of said top plate, and a space bar adapted to matingly engage corresponding ones of said pluralties of grooves in said base plate and said top plate; and
    left and right armrest members positioned on said fixed horizontal surface to the left and right of said base plate for receiving a user's forearms, each of said left and right armrest members having a horizontal top surface proximate a forward edge thereof and a downward sloping top surface rearward of said horizontal top surface.

2. A microscope stand and armrest system as in claim 1 further comprising a pull-out storage drawer positioned beneath said base plate.

3. A microscope stand and armrest system as in claim 1 wherein said left and right armrest members are farbricated of a polyurethane foam material.

4. A microscope stand and armrest system as in claim 3 wherein said polyurethane foam material has a density of 1.8.

5. A microscope stand and armrest system as in claim 1 further comprising an upwardly extending flange proximate the rearward edge of said top plate for preventing slippage of the microscope when said top plate is angularly elevated.

6. A microscope stand and armrest system for placement on a fixed horizontal surface comprising:
    a base plate having a plurality of height adjustment-/levelling feet attached to an underside thereof;
    a top plate coextensively positioned over said base plate for receiving a microscope thereon, said base plate and said top plate being hingedly attached at rearward edges thereof such that said top plate may be angularly elevated with respect to the horizontal to thereby tilt the microscope received thereon rearward toward the user;
    tilt control means engaging said base plate and said top plate for maintaining said top plate in a desired position of angular elevation; and
    left and right armrest members positioned on said fixed horizontal surface to the left and right of said base plate for receiving a user's forearms, each of said left and right armrest members having a horizontal top surface proximate a forward edge thereof and a downward sloping top surface rearward of said horizontal top surface, wherein each of said left and right armrest members includes one or more removable bottom sections for lowering said left and right armrest members.

7. A microscope stand and armrest system as in claim 6 further comprising a pull-out storage drawer positioned beneath said base plate.

8. A microscope stand and armrest system as in claim 6 wherein said left and right armrest members are fabricated of a polyurethane foam material.

9. A microscope stand and armrest system as in claim 8 wherein said polyurethane foam material has a density of 1.8.

10. A microscope stand and armrest system as in claim 6 further comprising an upwardly extending flange proximate the rearward edge of said top plate for preventing slippage of the microscope when said top plate is angularly elevated.

* * * * *